United States Patent [19]

Proksa et al.

[11] Patent Number: 4,582,224
[45] Date of Patent: Apr. 15, 1986

[54] NOZZLE FOR MIXING AT LEAST TWO FLOWABLE REACTION COMPONENTS

[75] Inventors: Ferdinand Proksa, Leverkusen; Hans-Michael Sulzbach, Koenigswinter; Reiner Raffel, Siegburg; Ferdinand Althausen, Neunkirchen, all of Fed. Rep. of Germany

[73] Assignee: Maschinenfabrik Hennecke GmbH, Leverkusen, Fed. Rep. of Germany

[21] Appl. No.: 643,561

[22] Filed: Aug. 23, 1984

[30] Foreign Application Priority Data

Sep. 3, 1983 [DE] Fed. Rep. of Germany ....... 3331840
Oct. 1, 1983 [DE] Fed. Rep. of Germany ....... 3335786
Oct. 1, 1983 [DE] Fed. Rep. of Germany ....... 3335787
Jun. 1, 1984 [DE] Fed. Rep. of Germany ....... 3420517

[51] Int. Cl.$^4$ .............................................. B67D 5/52
[52] U.S. Cl. ..................................... 222/135; 222/145; 264/328.6; 425/543; 425/562; 425/568
[58] Field of Search ............... 425/542, 543, 562, 564, 425/565, 566, 568, 4 R, 130, 147, 817 R; 264/328.6; 422/133; 239/533.1, 584, 410, 412, 416, 417; 222/135, 145, 190, 510

[56] References Cited

U.S. PATENT DOCUMENTS

| 3,643,688 | 2/1972 | Meinert | 222/145 |
| 3,771,963 | 11/1973 | Breer et al. | 422/133 |
| 3,947,177 | 3/1976 | Eckardt | 425/130 |
| 3,972,664 | 8/1976 | Fillmann | 425/130 |
| 4,013,391 | 3/1977 | Boden et al. | 425/145 |
| 4,117,955 | 10/1978 | Sokolow | 239/416 |
| 4,152,730 | 4/1985 | Kudert et al. | 425/130 |
| 4,188,356 | 2/1980 | Weber et al. | 425/817 R |
| 4,314,955 | 2/1982 | Boden et al. | 425/543 |
| 4,452,917 | 6/1984 | Proksa et al. | 425/130 |
| 4,512,730 | 4/1985 | Kudert et al. | 425/130 |

FOREIGN PATENT DOCUMENTS

3210978 9/1983 Fed. Rep. of Germany .
1324368 7/1973 United Kingdom ............... 425/564

Primary Examiner—Jay H. Woo
Assistant Examiner—Joye L. Woodard
Attorney, Agent, or Firm—Gene Harsh; Joseph C. Gil

[57] ABSTRACT

A nozzle is used to mix two or more flowable reaction components which nozzle has a force controlled injection needle (7) and a force controlled needle casing (12) guided in a guiding bore (12). One component emerges centrally into an outlet channel (3) while the opening (25,26) of at least one further supply pipe (23,24) lies in the area of a sealing surface (4) which limits one side of the guide bore (2) and which forms a tight fit (18) with an outer sealing surface (17) thereof when the needle casing (12) is in a closed position.

7 Claims, 2 Drawing Figures

NOZZLE FOR MIXING AT LEAST TWO FLOWABLE REACTION COMPONENTS

BACKGROUND OF THE INVENTION

German Patent Application P 33 31 840.9 (corresponding to U.S. application Ser. No. 643,508, filed on the same day as the present application) relates to a nozzle for mixing at least two flowable reaction components comprising a housing; component supply pipes leading into the housing; a housing bore arranged in the housing having a co-axial outlet channel in its end face; at least one needle casing which is guided co-axially in the housing bore; an injection needle which is guided co-axially in the needle casing; a first chamber located between the wall of the housing bore and the needle casing with one of the component supply pipes opening into said first chamber; a second chamber arranged between the needle casing and the injection needle with another component supply pipe opening into said second chamber; wherein in the closed position, said injection needle forms a tight fit with the internal end face of the needle casing, and the external end face of said needle casing forms a tight fit with the internal end face of the housing bore; and wherein in the open position, said injection needle frees a co-axial nozzle opening of the needle casing and an opening is formed between the external end face of the needle casing and the internal end face of the housing bore. The injection needle is provided with a co-axial plug, the cross-sectional shape and size of which is adapted to that of the nozzle opening of the needle casing and that of the outlet channel and which, in the closed state fills the outlet channel up to the outlet. A forced control is provided for the injection needle and the needle casing at the other end thereof.

In the above described nozzle, a component is supplied through the central opening and further components are supplied through concentric annular gaps.

The sealing surfaces which are provided for the tight fits have to be made extremely accurately to prevent any leakage in the closed state, because each of the components is under pressure around the sealed annular nozzle gap. If the needle casings become slightly out of true, the sealing surfaces warp and cause the tight fits to leak. A further disadvantage of this nozzle is that a further needle casing must generally be provided for each additional component above two reaction components.

Thus, an object of the present invention is to improve the above described nozzle so that the risk of leakage caused by the tight surfaces becoming out of true is reduced and so that in the case of the supply of more than two components, only one needle casing or a reduced number of needle casings is required.

DESCRIPTION OF THE INVENTION

Figure 1:
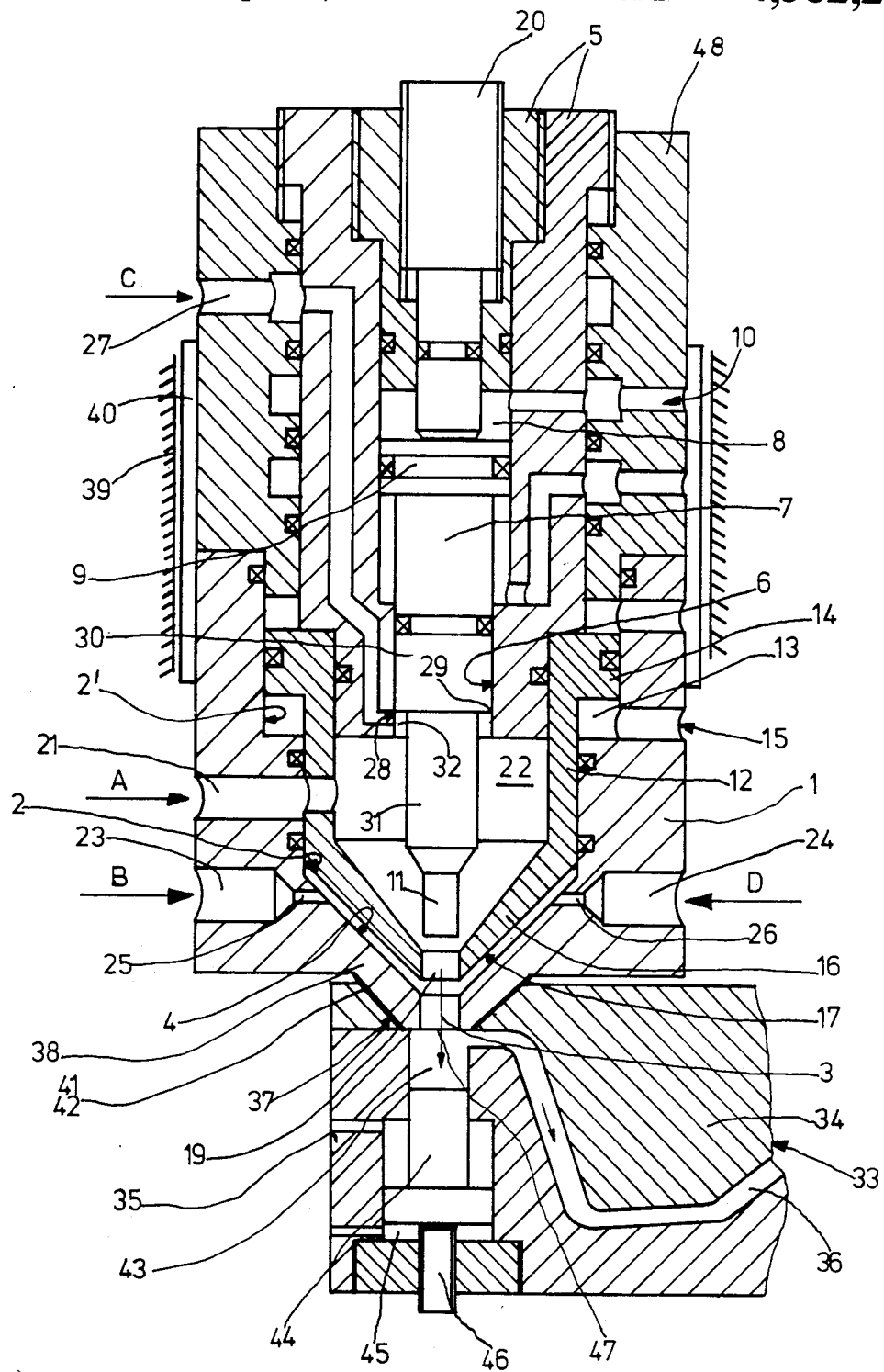
FIG. 1 shows the nozzle of the present invention in the open position.
Figure 2:
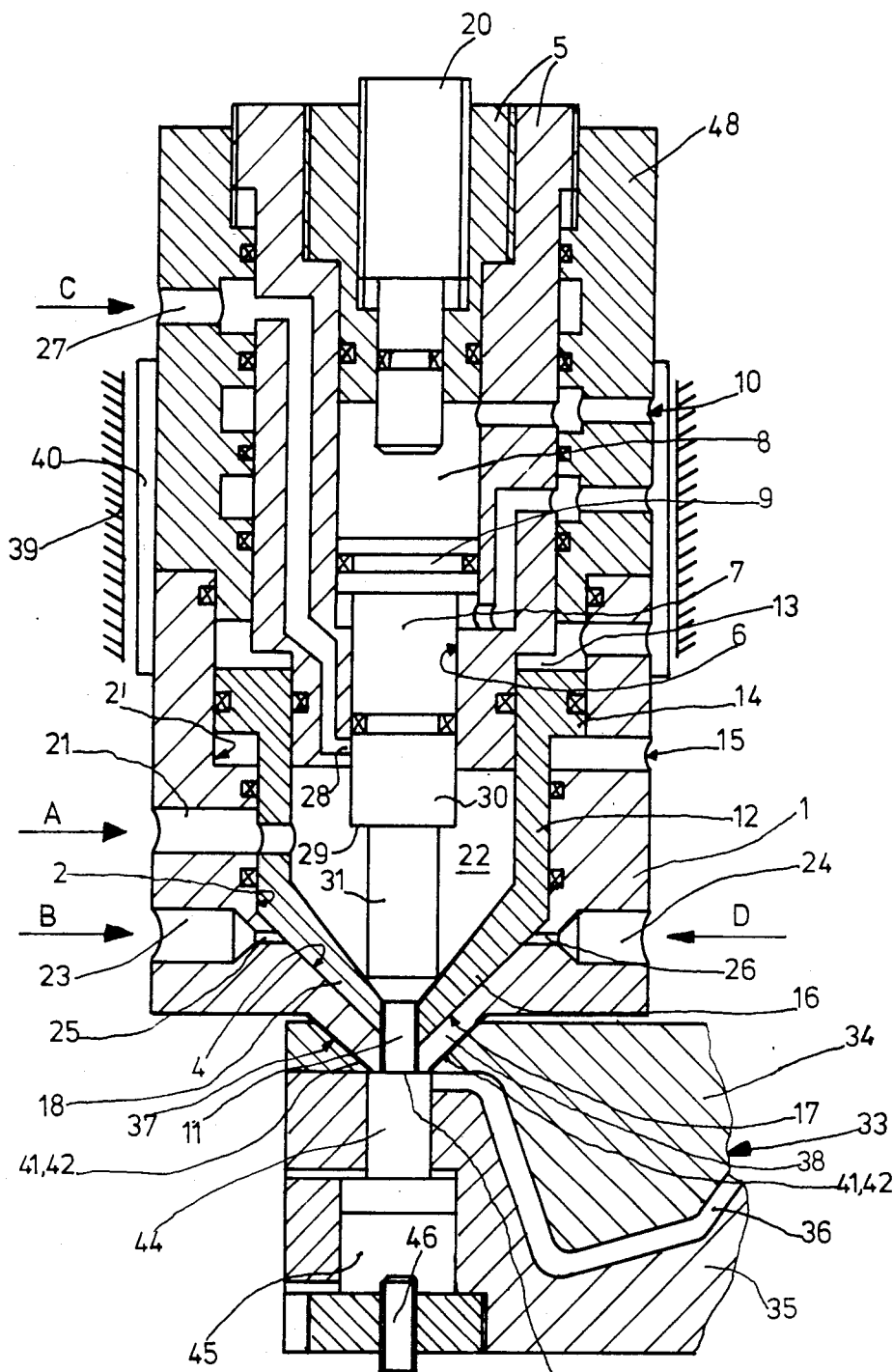
FIG. 2 shows the nozzle in the closed position.

The objects named above are achieved by a nozzle for mixing at least two flowable reaction components which react to completion to produce plastics material and more particularly to produce foam, comprising a nozzle housing; a guide bore arranged therein, which is limited on the one end by a sealing surface which conically tapers towards an axial outlet channel and on the other end, is sealed by a cover with an insert located therein; an injection needle which is arranged in an axial bore of the insert, which is provided, on the one end, with a plug which fills the outlet channel in the closed position and on the other end is forcibly controllable; a needle casing which is guided in a movable manner in the area between the insert and the sealing surface; a chamber provided in the interior of the needle casing and through which the injection needle passes, said chamber being connected to a component supply pipe; the needle casing having a base up to the outlet channel, which base has an opening which is aligned with the outlet channel, the outer surface of the base being designed as a sealing surface; and, wherein in the closed position, the needle casing forms a tight fit with the sealing surface of the housing bore; a supply pipe being provided for at least one further flowable component, the opening of which supply pipe is arranged in the region of the sealing surface of the housing bore and is sealed in the closed position by the sealing surface of the needle casing.

By these means the risk of leakage is considerably reduced as the component pressure is no longer applied around the tight fit in the closed position, but only in the area of the opening. As openings of this type are relatively small, the sealing surfaces would have to distort to a large degree to cause leakage.

A mixing device has been proposed (European Patent Application No. 0 090 257), in which the component supply pipes also open into a gap formed between the housing and the insert (hollow piston) with a discharge piston passing centrally through the insert. The insert itself rotates so that the gap functions as a shearing gap and thus forms the mixing chamber. Mixing the reaction components in the gap itself causes problems.

In contrast, in the new nozzle, the components are mixed outside the gap since only one reaction component is introduced into the gap. No problems are involved in supplying further components, which are not reactive with the first mentioned component nor with each other into the gap.

According to one particular embodiment, several openings are assigned to the supply pipe. They are preferably distributed in a uniform manner around the central axis of the nozzle.

According to one embodiment, the opening(s) is (are) oriented radially. In this manner, the component which is supplied radially is injected depending on the inherent energy thereof—into or surrounding the centrally flowing component.

According to another embodiment, the opening(s) is (are) tangentially oriented. In this manner, the flow of the central component is surrounded, a relative movement being produced at the boundary layer between the two component flows.

It is also possible that the opening(s) is (are) oriented in an intermediate position between radial and tangential orientation.

Depending on whether the proportion of radial or tangential orientation is greater, the effects caused thereby are more or less pronounced.

Flow effects may also be achieved by orientating the opening to be inclined relative to the central axis.

These various embodiments can be of help to those in the art, in that suitable orientation of the openings of the supply pipes can be determined by tests, in relation to the physical properties of each of the components and then used in practice.

According to one embodiment, a supply pipe is provided for an additional component, the opening of which points into the guide bore of the injection needle and in which the injection needle is provided with a shoulder which acts as a control edge, such that when the injection needle is in the open position, the opening of the shoulder is freed and, in the closed position, is sealed by the shoulder. This opens the possibility of adding at least one additional component to the centrally supplied component. This may be advantageous under certain circumstances.

According to one embodiment, the guiding bore for the injection needle is arranged in the insert. As an alternative, it can be arranged in the needle casing. In both embodiments, the supply of the additional component is released or interrupted by the shoulder of the injection needle. Supply pipes for several additional components may, of course, be arranged in the same manner. The openings thereof are then preferably arranged at the same annular spacings from each other. It is also possible to assign several openings to one supply pipe. Those components which are compatible with the additional components are passed via the chamber located in the needle casing. A mixture of the two (or more) components remains in the chamber after each phase.

A further particular embodiment is characterized by combining the nozzle with a molding tool by means of conveying guide devices and corresponding coupling elements.

This embodiment has the advantage of being able to convey an otherwise stationary nozzle to molding tools which, for example, pass along the rotating table in phases. Known control devices can thus advantageously be provided which only start the mixing process when the molding tool is sealed and the nozzle is conveyed in a tight manner. Sliding guide devices, for example, may serve as conveying guide devices. The conveying process itself can, for example, be carried out by means of an assigned hydraulic drive mechanism.

A relaxation chamber arranged in front of the mold cavity is preferably provided in this embodiment, in the wall of the molding tool. The inlet opening of the relaxation chamber corresponds with the outlet opening thereof when the multi-substance nozzle is in a coupling position. The relaxation chamber is closable by means of a closure slide which is guided in the relaxation chamber. In this manner, the outlet opening of the nozzle can be made tight by coupling it on to the molding tool. The closure slide may be designed as an on/off pusher. It may, however, also open against an initial tension under the increasing pressure of the mixture and may be designed as an ejector for the remaining mixture which is reacting to completion in the relaxation chamber. This closure slide is, for example, designed such that the relaxation chamber serves as a guiding device for it. The stroke thereof is preferably adjustable by an adjustable stop. The axis of the closure slide is preferably aligned with the axis of the nozzle, but can also point in any other direction. Both axes can be arranged at right angles to each other. The closure slide may easily act hydraulically or mechanically. It is preferably automatically controllable.

In the drawings, the novel nozzle is illustrated, purely diagrammatically by way of a sectional view of an embodiment for four components, combined with a shaping tool and is explained in more detail in the following.

A guide bore 2,2' is arranged in a nozzle housing 1. The guide bore is limited, on the one end by a sealing surface 4 which tapers to an axial outlet channel 3 and is sealed on the other end by a cover 48 with insert 5 located therein. A guide bore 6 for an injection needle 7 is arranged in the insert 5. At the rear end thereof, the injection needle 7 has a piston 9 guided in a cylinder chamber 8 which is reciprocally chargeable, both of which are part of a force control 10 for the injection needle 7. The front end of the injection needle 7 is provided with a plug 11, which, in the closed position, completely fills the outlet channel 3 and thus also serves as a cleaning tool for expelling the remaining mixture left in the outlet channel 3. A moveable needle casing 12 is provided between the sealing surface 4 and the insert 5. The rear end thereof is also a piston 14 which is guided in a hydraulic cylinder 13 and which is reciprocally chargeable, both parts of which are a forcible control 15. The front end of the needle casing 12 has a base 16, the outer surface of which is designed as a sealing surface 17. In the closed position the needle casing forms a tight fit 18 with the sealing surface 4. The base 16 has an axial opening 19 which is adapted to the outlet channel 3. The stroke of the needle casing 12—and thus the width of the gap between the sealing surface 4 and 17—is adjustable by means of the axially moveable insert 5. An adjusting screw 20 for adjusting the stroke of the injection needle 7 is mounted in the insert 5. A chamber 22 which is connected to a supply pipe 21 for component A is located in the needle casing 12, from which chamber component A emerges through opening 19 when the injection needle 7 is in the open position. Each of the supply pipes 23 and 24 for components B and D have an opening 25 and 26 which enter through the sealing surface 4. They are positioned diametrically opposite each other. A supply pipe 27 for component C passes through the cover 48 and the insert 5 to the end which faces that of the chamber 22. The opening 28 thereof however, points into the guide bore 6 for the injection needle 7. The injection needle 7 has a shoulder 29, which is arranged such that the edge of the thicker section 30 of the shaft acts as a control edge and frees the opening 28 of the supply pipe 27 in the open position. Component C thus flows through the remaining annular gap 32 between the guide bore 6 and the thinner section 31 of the shaft into the chamber and combines first with component A. The additional component C then passes, together with component A, into the opening 19 and then into the outlet channel 3 where components B and D are added. If the injection needle 7 closes, then the shoulder 29 passes over the opening 28 and the thicker section of the shaft 30 seals it.

The nozzle is combined with a shaping tool 33. This consists of two mold halves 34,35 which enclose the mold cavity 36. The mold half 34 which faces the nozzle has a center recess 37 which corresponds to a central shoulder 38 of the nozzle. The shaping tool 33 is fixed while the nozzle moves towards the molding tool 33 in conveying guide devices 39,40 (which are purely diagrammatically). The central shoulder 38 and the central recess 37 have tight locating surfaces 41,42 in the closed position. A relaxation chamber is provided in the other mold half 35 axially to the central recess 37. It also acts as a guide device for closure slide 44, to which a hydraulic drive mechanism 45 and adjustable stop 46 are assigned. Thus, in this embodiment, the closure slide 44 not only has an on/off function, but may additionally be used as an expeller for the remaining mixture which is hardening in the relaxation chamber 43. The relaxation chamber 43 is not completely filled in the position of the nozzle shown until after the closure slide 44 has been conveyed to the molding tool 33 and, when it has been conveyed, it seals the outlet channel 3 of the nozzle until the injection process begins. The outlet channel 3 and the inlet opening 47 of the relaxation chamber 43 directly border each other in the open position of the multi-substance nozzle and lie on the same axis.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A nozzle for mixing at least two flowable reaction components comprising:
   (a) a nozzle housing;
   (b) a guide bore arranged in said housing, said guide bore being limited on one end by a sealing surface which conically tapers to an axial outlet channel, and, being sealed on the other end by a cover having an insert located therein, said insert having an axial bore arranged therein,
   (c) a movable needle casing located between said insert and said sealing surface, the movement of said needle casing being restricted on one end by said insert and being restricted on the other end by said sealing surface, wherein said needle casing has a base which has an outlet opening in alignment with said axial outlet channel and wherein the outer surface of said base forms a tight fit with said sealing surface in the closed position,
   (d) a chamber in the interior of said needle casing, said chamber being connected to a first component supply line, and wherein said outlet opening is located on one end of said chamber, and wherein the other end of said chamber is limited by said insert,
   (e) a nozzle needle guided in said axial bore and in said chamber, wherein said needle has a plug at one end, which plug fills said outlet opening and said outlet channel in the closed position, and wherein said needle is forceably controllable at the other end, and
   (f) a second component supply line, said second supply line opening below said base, whereby in the closed position, said second supply line is closed by said base.

2. The nozzle of claim 1 wherein each supply line has several openings.

3. The nozzle of claim 2 wherein the openings of said supply lines are distributed uniformly about the central axial of said nozzle.

4. The nozzle of claim 3 wherein the openings of said supply lines are oriented radially.

5. The nozzle of claim 3 wherein the openings of said supply lines are oriented tangentially.

6. The nozzle of claim 3 wherein the openings of said supply lines are oriented intermediately between radial and tangential.

7. The nozzle of claim 1 further comprising a third component supply line, said third supply line opening in said axial bore, and wherein said needle has a shoulder which acts as a control edge such that when said needle is in the open position, the opening of said third supply line is opened and when said needle is in the closed position, the opening of said third supply line is closed.

* * * * *